(12) United States Patent
Jaworski et al.

(10) Patent No.: US 9,702,175 B2
(45) Date of Patent: Jul. 11, 2017

(54) HINGE AND LOCKING DEVICE

(71) Applicant: Hyundai Translead, San Diego, CA (US)

(72) Inventors: Les Jaworski, San Diego, CA (US); Jesus Rakob Melendez Vazquez, Tijuana (MX)

(73) Assignee: Hyundai Translead, San Diego, CA (US)

( * ) Notice: Subject to any disclaimer, the term of this patent is extended or adjusted under 35 U.S.C. 154(b) by 0 days.

(21) Appl. No.: 14/742,417

(22) Filed: Jun. 17, 2015

(65) Prior Publication Data

US 2016/0333619 A1 Nov. 17, 2016

Related U.S. Application Data

(60) Provisional application No. 62/161,084, filed on May 13, 2015.

(51) Int. Cl.
| | | |
|---|---|---|
| *B60P 1/00* | (2006.01) | |
| *B60P 1/36* | (2006.01) | |
| *E05D 11/10* | (2006.01) | |
| *E05D 5/04* | (2006.01) | |
| *E05D 5/02* | (2006.01) | |
| *E05D 3/02* | (2006.01) | |

(52) U.S. Cl.
CPC ............ *E05D 11/1014* (2013.01); *B60P 1/00* (2013.01); *B60P 1/36* (2013.01); *E05D 5/0207* (2013.01); *E05D 5/043* (2013.01); *E05D 11/1007* (2013.01); *E05D 2003/027* (2013.01); *E05Y 2900/516* (2013.01); *E05Y 2900/544* (2013.01)

(58) Field of Classification Search
CPC .... B62D 33/08; B62D 33/042; B62D 33/046; B62D 25/2054; B62D 53/067; E05D 11/1014; E05D 5/0207; E05D 11/10; E05D 5/0437; B60P 3/055; B60P 9/00; B60P 1/00; B60P 1/36; B61D 45/004; B61D 45/006; B61D 45/001; B61D 3/04
USPC ......... 296/24.44, 182.1, 184.1, 186.1, 186.4; 410/29, 29.1, 156; 105/372, 375
See application file for complete search history.

(56) References Cited

U.S. PATENT DOCUMENTS

| | | | | |
|---|---|---|---|---|
| 1,351,125 | A | * | 8/1920 | Rex ..................... B61D 45/006 105/372 |
| 2,077,649 | A | * | 4/1937 | Sweeley ............. B61D 45/006 105/372 |
| 2,661,705 | A | * | 12/1953 | Dean ..................... B61D 17/10 105/375 |
| 2,683,427 | A | * | 7/1954 | Blanning ............... B61D 17/10 105/375 |
| 2,825,600 | A | * | 3/1958 | MacOmber .............. B60P 3/00 105/370 |
| 3,875,871 | A | * | 4/1975 | Thornton ................. B61D 3/04 105/375 |

(Continued)

*Primary Examiner* — Gregory Blankenship
(74) *Attorney, Agent, or Firm* — Procopio, Cory, Hargreaves & Savitch LLP

(57) ABSTRACT

An apparatus or device including: at least one hinge assembly coupled to the deck panel and the wall, the at least one hinge assembly configured to move the deck panel between a stored position and a work position; a hook holder coupled to the wall; and a locking device coupled to the deck panel, the locking device configured to protrude out and engage the hook holder when the deck panel is moved from the work position to the stored position.

20 Claims, 10 Drawing Sheets

(56) References Cited

U.S. PATENT DOCUMENTS

| | | | | | |
|---|---|---|---|---|---|
| 3,897,971 | A | * | 8/1975 | Evans | B62D 33/042 105/372 |
| 3,911,832 | A | * | 10/1975 | Vandergriff | B60R 7/00 105/372 |
| 4,281,870 | A | * | 8/1981 | Ehrlich | B61D 3/02 105/372 |
| 4,659,132 | A | * | 4/1987 | Day | B60P 3/055 105/371 |
| 4,695,087 | A | * | 9/1987 | Hollrock | B62D 33/08 296/100.06 |
| 4,702,653 | A | * | 10/1987 | Gaulding | B60P 7/15 403/254 |
| 5,042,863 | A | * | 8/1991 | Fraga | B60P 1/00 108/67 |
| 5,375,534 | A | * | 12/1994 | Adams | B60P 7/135 105/372 |
| 6,585,306 | B1 | * | 7/2003 | Smith | B60P 1/00 296/24.44 |
| 6,854,400 | B2 | * | 2/2005 | Sullivan | B60P 1/00 105/372 |
| 7,293,813 | B2 | * | 11/2007 | Squyres | B60P 1/00 105/372 |
| 7,338,110 | B1 | * | 3/2008 | Eckloff | B60R 11/00 296/182.1 |
| 8,894,122 | B2 | * | 11/2014 | Gilbert | B62D 25/2054 296/24.44 |
| 2006/0076791 | A1 | * | 4/2006 | Powers, Jr. | B60P 1/00 296/24.44 |
| 2006/0255609 | A1 | * | 11/2006 | Squyres | B60P 1/00 296/24.44 |
| 2008/0012372 | A1 | * | 1/2008 | Squyres | B60P 1/00 296/24.44 |
| 2014/0110960 | A1 | * | 4/2014 | Gilbert | B62D 25/2054 296/24.44 |
| 2014/0158653 | A1 | * | 6/2014 | Evans | E05D 5/0238 211/90.02 |
| 2015/0225021 | A1 | * | 8/2015 | Evans | B60P 3/007 296/24.4 |

* cited by examiner

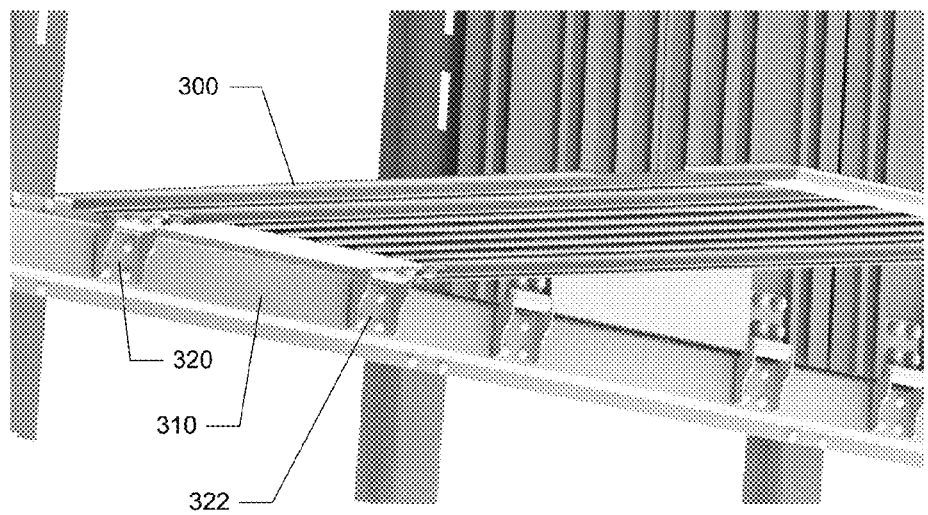
FIG. 3A
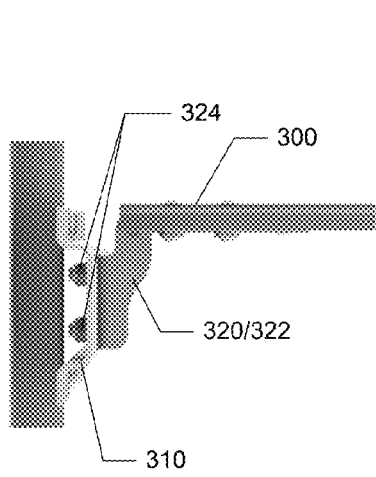 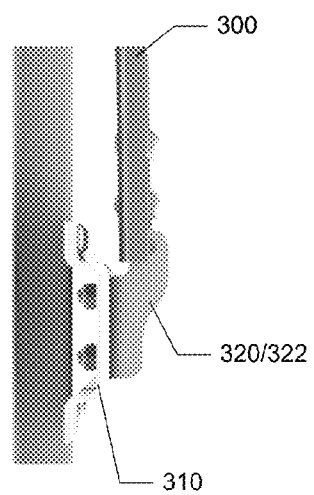
FIG. 3B        FIG. 3C

FIG. 6A   FIG. 6B

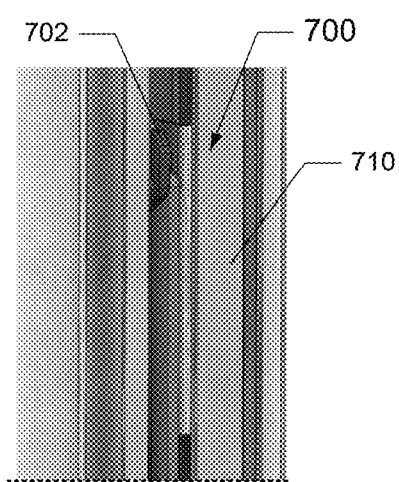
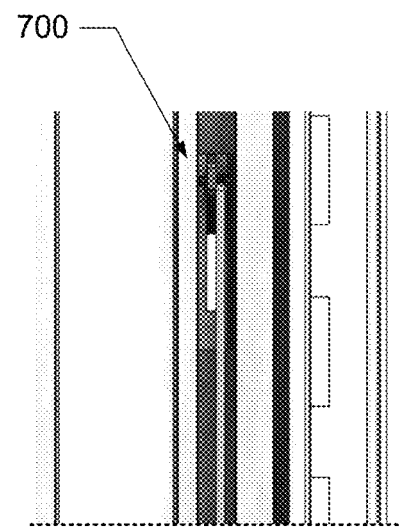
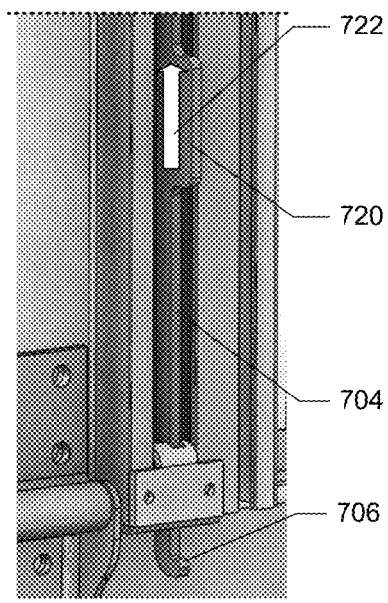
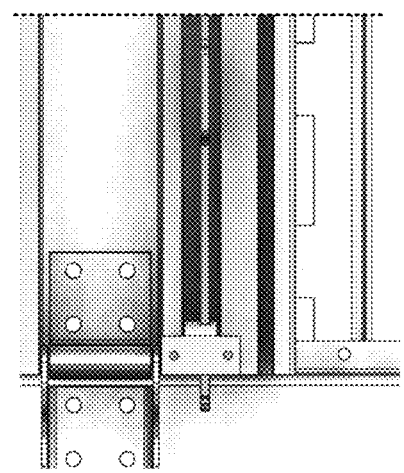
FIG. 7A  FIG. 7B

HINGE AND LOCKING DEVICE

CROSS-REFERENCE TO RELATED APPLICATIONS

This application claims the benefit of priority under 35 U.S.C. §119(e) of U.S. Provisional Patent Application No. 62/161,084, filed May 13, 2015, entitled "Hinge and Locking Device." The disclosure of the above-referenced application is incorporated herein by reference.

BACKGROUND

Field of the Invention

The present invention relates to a hinge and locking device, and more specifically, to a hinge and locking device for securing a deck panel used in a cargo section of a trailer to the side of the cargo section.

Background

A trailer may include a deck system in its cargo section. The deck system may include one of more deck panels including a conveyer deck panel. Each of the deck panels can be moved to a work position or stored position.

SUMMARY

The present invention includes a hinge and locking device for securing a deck panel used in a cargo section of a trailer to the side of the cargo section.

In one implementation, an apparatus for a deck panel coupled to a wall is disclosed. The apparatus includes: at least one hinge assembly coupled to the deck panel and the wall, the at least one hinge assembly configured to move the deck panel between a stored position and a work position; a hook holder coupled to the wall; and a locking device coupled to the deck panel, the locking device configured to protrude out and engage the hook holder when the deck panel is moved from the work position to the stored position.

In another implementation, an apparatus for coupling a deck panel to a wall is disclosed. The apparatus includes: means for moving the deck panel between a stored position and a work position, the means for moving the deck panel coupled to the deck panel and the wall; means for engaging a hook holder when the deck panel is moved from the work position to the stored position; and means for extending configured to push the means for engaging out of the deck panel to engage the hook holder when the deck panel is moved from the work position to the stored position, wherein the means for extending is configured to retract the means for engaging into the deck panel when the deck panel is moved from the stored position to the work position.

In another implementation, a device coupled to a deck panel is disclosed. The device includes: a plurality of hinges configured to move the deck panel between a stored position and a work position; a locking mechanism including an extension arm and a hook coupled to the deck panel, and a hook holder coupled to a surface, wherein the extension arm pushes the hook out of the deck panel to engage the hook holder when the deck panel is moved from the work position to the stored position, and wherein the extension arm retracts the hook into the deck panel when the deck panel is moved from the stored position to the work position.

In another implementation, a device coupled to a deck panel is disclosed. The device includes: a plurality of hinges configured to move the deck panel between a stored position and a work position; a locking mechanism including an extension arm and a hook coupled to the deck panel, and a hook holder coupled to a surface, wherein the extension arm pushes the hook out of the deck panel to engage the hook holder when the deck panel is moved from the work position to the stored position, and wherein the extension arm retracts the hook into the deck panel when the deck panel is moved from the stored position to the work position.

Other features and advantages of the present invention should be apparent from the present description which illustrates, by way of example, aspects of the invention.

BRIEF DESCRIPTION OF THE DRAWINGS

The details of the present invention, both as to its structure and operation, may be gleaned in part by study of the appended further drawings, in which like reference numerals refer to like parts, and in which:

FIG. 3A is a bottom perspective view of a deck panel in a work position in accordance with one embodiment of the present disclosure;

FIG. 3B is a side view of the deck panel in a work position in accordance with one embodiment of the present disclosure;

FIG. 3C is a side view of the deck panel in a stored position in accordance with one embodiment of the present disclosure;

FIG. 6A is a side view of the deck panel positioned in a stored position in accordance with one embodiment of the present disclosure;

FIG. 6B is a side view of the deck panel positioned in between the stored position and the work position;

FIG. 7A is bottom views of a deck panel with a locking device disposed in the bottom part in accordance with one embodiment of the present disclosure;

FIG. 7B is bottom views of a deck panel with a locking device disposed in the bottom part in accordance with another embodiment of the present disclosure;

DETAILED DESCRIPTION

As stated above, a deck panel in the cargo section of a trailer, for example, can be moved to a work position or stored position. However, when the deck panel is moved to a stored position, it can fall off the stored position and cause injury or damage the cargo, unless the deck panel is securely locked. Thus, several embodiments of a secure hinge and locking device for the deck panel in a stored position are proposed in the present application. In one embodiment, a hook in the deck panel is configured to rotate out as the deck panel is moved into the stored position and hook into a hook holder attached to the side wall of the interior of the cargo section.

After reading this description it will become apparent how to implement the invention in various implementations and applications. However, although various implementations of the present invention will be described herein, it is understood that these implementations are presented by way of example only, and not limitation. As such, this detailed description of various implementations should not be construed to limit the scope or breadth of the present invention.

Figure 1:
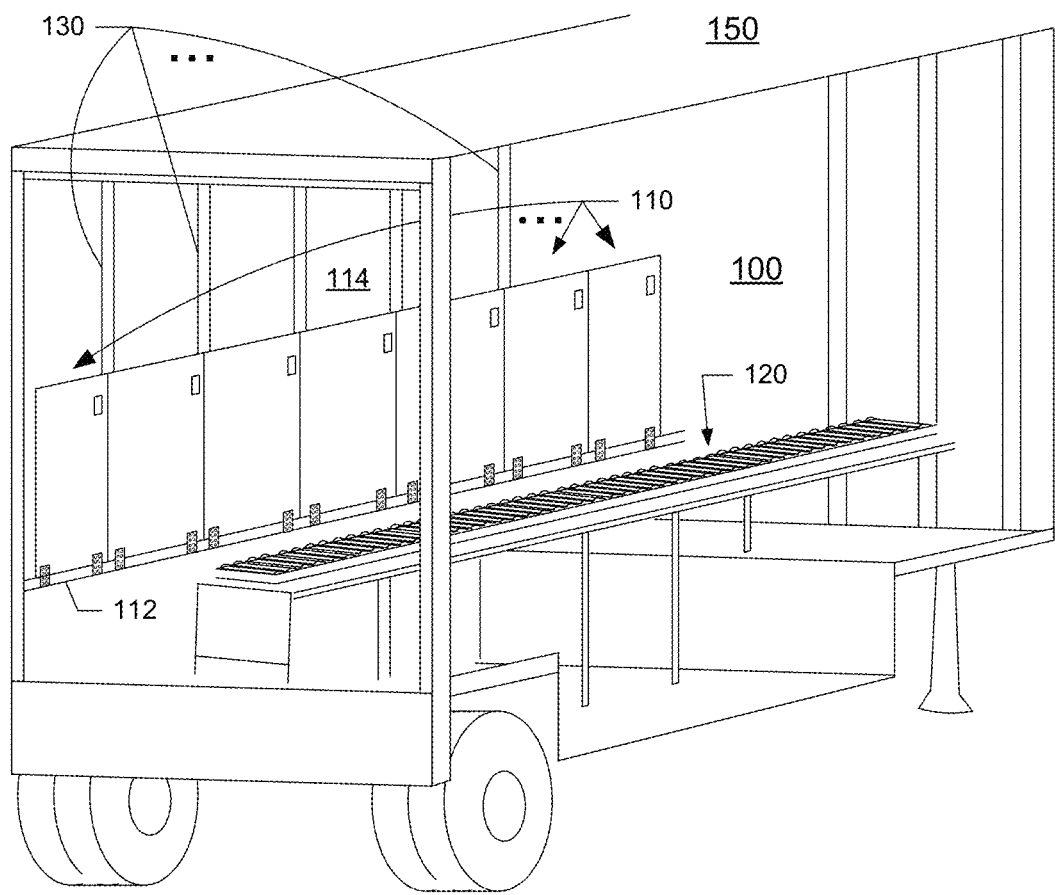
FIG. 1 is a cut-away view of the cargo section of a trailer including a deck system in accordance with one embodiment of the present disclosure.

FIG. 1 is a cut-away view of the cargo section 150 of a trailer including a deck system 100 in accordance with one embodiment of the present disclosure. The deck system 100 includes at least one deck panel 110 and a conveyor panel 120. Although the deck panels 110 are shown on the left side of the cargo section only, the deck panels can also be configured on the right side as well. The deck panels 110 are configured to provide an additional surface on which the cargo can be stowed. The conveyor panel 120 includes rollers to easily move the cargo in and out of the cargo section 150.

In the illustrated embodiment of FIG. 1, the deck system 100 also includes a side rail 112 coupled to the inner surface 114 of the cargo section 150. The deck panels 110 are coupled to the side rail 112 and can be moved between the work position and the stored position. In another embodiment, the deck panels 110 can be coupled to the inner surface 114 (or the wall) directly. The deck panels 110 can be moved between the work position and the stored position individually or in combination. The deck system 100 further includes at least one vertical post 130 coupled to the inner surface 114 of the cargo section 150. In one embodiment, each of the deck panels 110 includes a hook (e.g., element 800 in FIG. 8A) which protrudes out and hooks onto a hook holder (e.g., element 802 in FIG. 8A) configured on each of the vertical posts 130, when the deck panel is moved from a work position to a stored position.

Figure 2A:
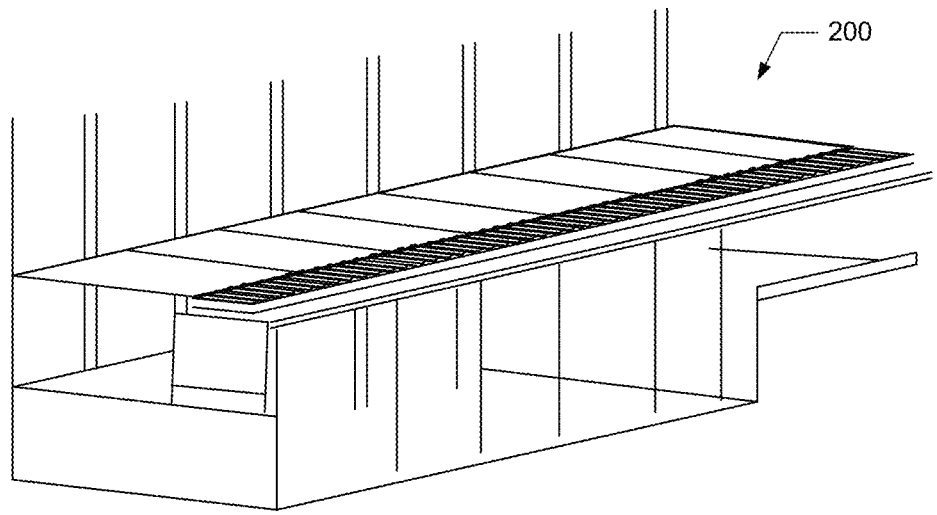
FIG. 2A shows the deck panels in a work position in accordance with one embodiment of the present disclosure.
Figure 2B:
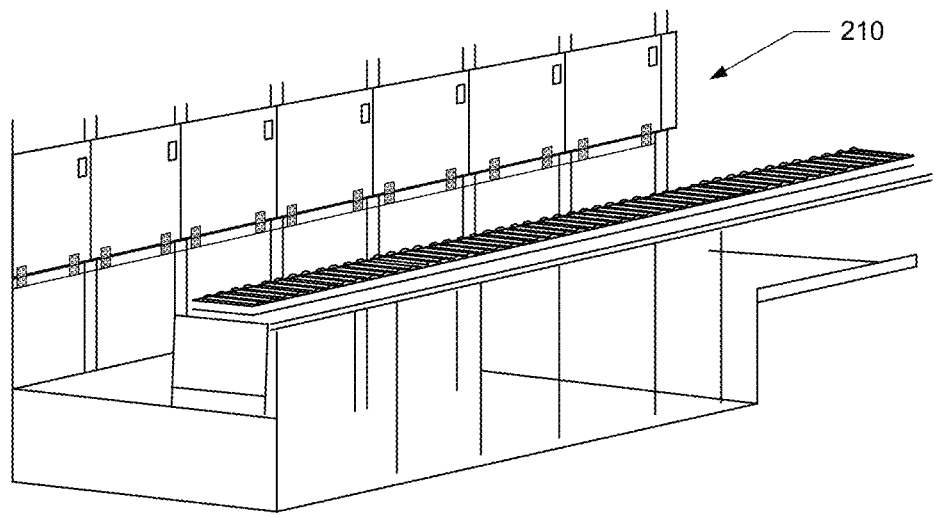
FIG. 2B shows the deck panels in a stored position in accordance with one embodiment of the present disclosure.

FIG. 2A and FIG. 2B show the deck panels in a work position 200 and a stored position 210, respectively, in accordance with one embodiment of the present disclosure. When the deck panels are in a work position 200, the deck panels provide an additional surface on which the cargo can be placed and/or moved in and out of the cargo section. When the deck panels are in a stored position, the cargo section can be configured differently to store the cargo differently or keep the cargo section empty.

FIG. 3A, FIG. 3B, and FIG. 3C show various views of a deck panel in different positions. For example, FIG. 3A is a bottom perspective view of a deck panel 300 in a work position in accordance with one embodiment of the present disclosure. In this embodiment, the deck panel 300 is attached to the side rail 310 using a pair of hinge assemblies 320, 322. FIG. 3B is a side view of the deck panel 300 in a work position in accordance with one embodiment of the present disclosure. In this view, the deck panel 300 is attached to the side rail 310 with a hinge assembly 320 or 322. FIG. 3C is a side view of the deck panel 300 in a stored position in accordance with one embodiment of the present disclosure. Again, the deck panel 300 is attached to the side rail 310 with a hinge assembly 320 or 322. Although a pair of hinge assemblies 320, 322 is used in the illustrated embodiment of FIG. 3A, one or more hinge assemblies can be used to perform the same function.

Figure 4A:
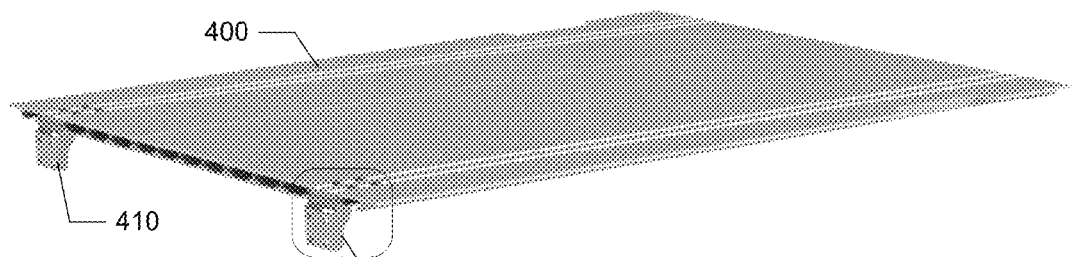
FIG. 4A is a side perspective view of a deck panel and a pair of attached hinge assemblies.
Figure 4B:
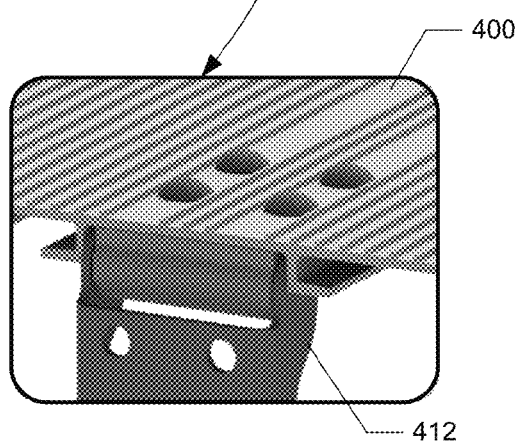
FIG. 4B is a detailed side perspective view of the attachment of the hinge assembly to the deck pane.
Figure 4C:
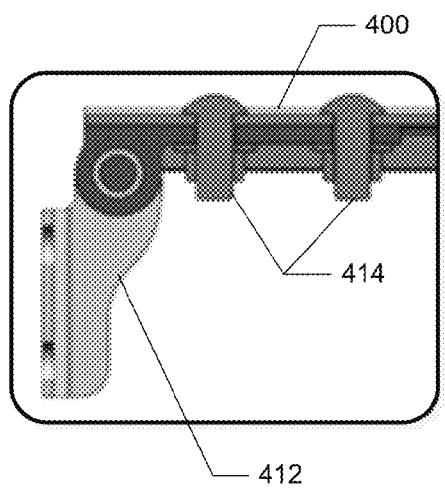
FIG. 4C is a detailed side view of the attachment of the hinge assembly to the deck panel.

FIG. 4A, FIG. 4B, and FIG. 4C show detailed views of the deck panel and the attached hinge assemblies in accordance with one embodiment of the present disclosure. FIG. 4A is a side perspective view of a deck panel 400 and a pair of attached hinge assemblies 410, 412. FIG. 4B is a detailed side perspective view of the attachment of the hinge assembly 412 to the deck panel 400. FIG. 4C is a detailed side view of the attachment of the hinge assembly 412 to the deck panel 400. Although a pair of hinge assemblies 410, 412 is used in the illustrated embodiment of FIG. 4A, one or more hinge assemblies can be used to perform the same function.

Figure 5:
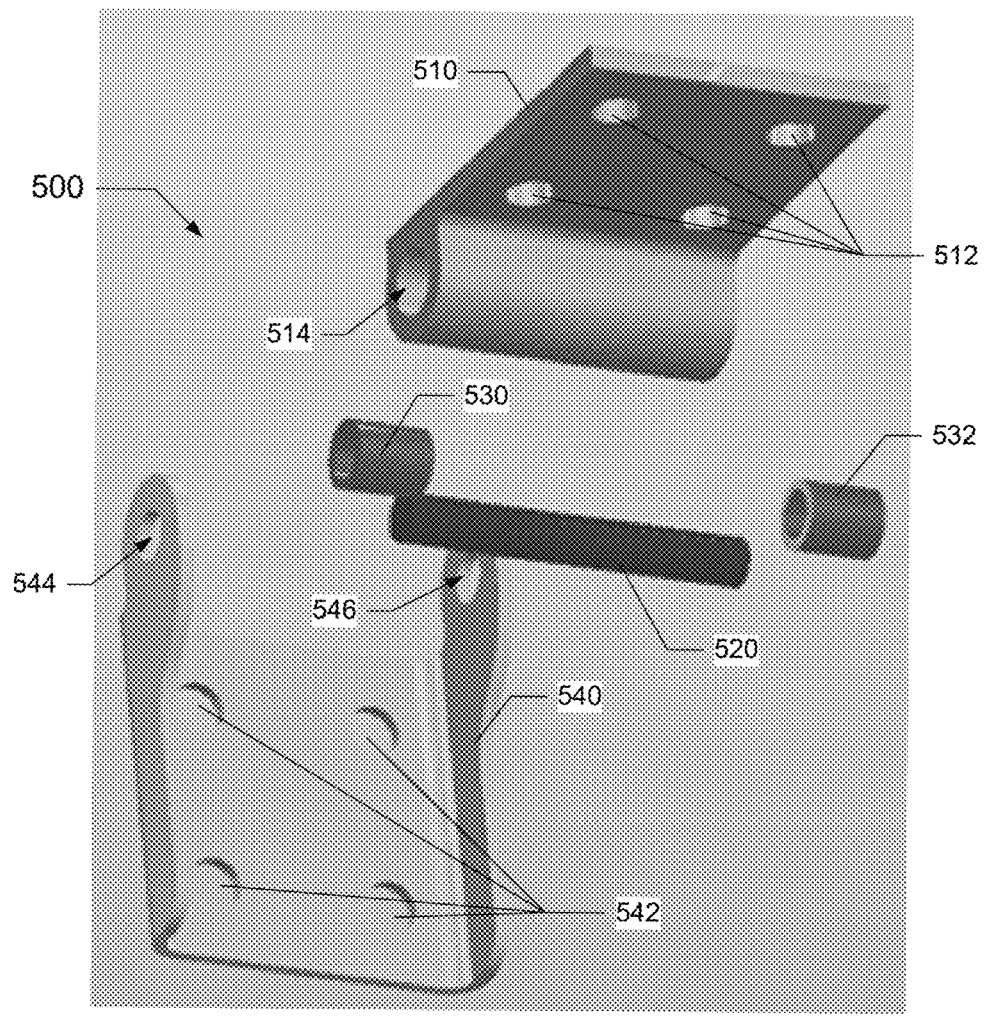
FIG. 5 is an exploded view of a hinge assembly in accordance with one embodiment of the present disclosure.

FIG. 5 is an exploded view of a hinge assembly 500 in accordance with one embodiment of the present disclosure. In the illustrated embodiment of FIG. 5, the hinge assembly 500 includes a hinge strap 510, a pin 520, a pair of bearings 530, 532, and a hinge butt 540. Although a pair of bearings 530, 532 is used in the illustrated embodiment of FIG. 5, one or more bearings can be used to perform the same function. The hinge strap 510 includes a plurality of holes 512 for accepting screws (e.g., screws 414 in FIG. 4C) to attach the hinge strap 510 to the deck panel (e.g., deck panel 400 in FIG. 4C). The hinge strap 510 also includes an opening 514 through which the pin 520 and the bearings 530, 532 are inserted. The hinge butt 540 includes a plurality of holes 542 for accepting screws (e.g., screws 324 in FIG. 3B) to attach the hinge strap 510 to the side rail (e.g., side rail 310 in FIG. 3B). The hinge butt 540 also includes a pair of hinge butt holes 544, 546 which secures the both ends of the pin 520. Thus, in one embodiment, the hinge assembly 500 is assembled by: attaching the hinge butt 540 to the side rail (e.g., side rail 310 in FIG. 3B) using a plurality of screws (e.g., screws 324 in FIG. 3B); inserting the bearings 530, 532 into the opening 514 in the hinge strap 510; aligning the opening 514 of the hinge strap 510 between the pair of hinge butt holes 544, 546; inserting the pin 520 through the hinge butt holes 544, 546 and the bearings 530, 532 positioned in the opening 514; inserting the hinge strap 510 into the deck panel (e.g., deck panel 400 in FIG. 4C); and attaching the deck panel to the hinge strap 510 using a plurality of screws (e.g., screws 414 in FIG. 4C).

In one embodiment, the hinge butt 540 is made of ⅛" zinc-plated high tensile steel, while the pin 520 is made of stainless steel and the two bearings 530, 532 are made of Molybdenum-Disulfide-filled (MDS-filled) nylon. In this embodiment, the pin 520 is fixedly secured on both ends in the hinge butt holes 544, 546 to prevent the pin 520 from rotating. However, the hinge strap 510 rotates freely with the two bearings 530, 532. The bearings 530, 532 are configured to have a high bearing capacity so that they do not need to be lubricated. If the hinge assembly 500 is damaged, the entire assembly can be easily replaced by unscrewing the two set of screws from the deck panel and the side rail.

FIG. 6A, FIG. 6B, FIG. 6C, and FIG. 6D show the movement of a locking device 600 as the deck panel 610 is moved between the stored position and the work position. As shown in the illustrated embodiment of FIG. 6D, the locking device 600 includes, among other elements, an extension arm 620 and a hook 630. In one embodiment, the extension arm 620 includes a lock handle 622 which is used to manually retract the hook 630 and release the deck panel 610 from the stored position.

Figure 6C:
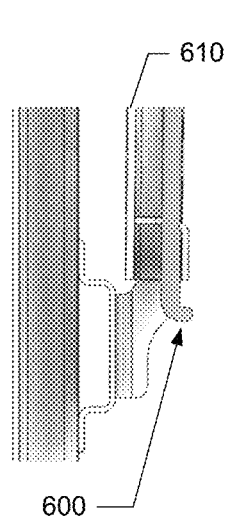
FIG. 6C is a side view of the deck panel positioned in a work position in accordance with one embodiment of the present disclosure.
Figure 6C:
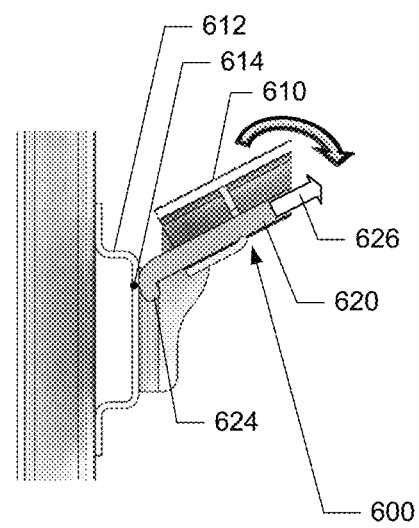
Figure 6C:
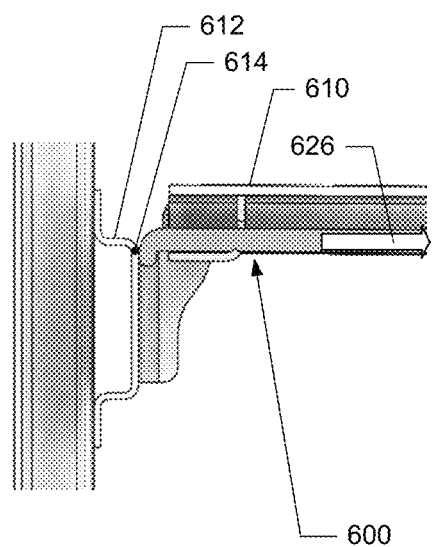
Figure 6D:
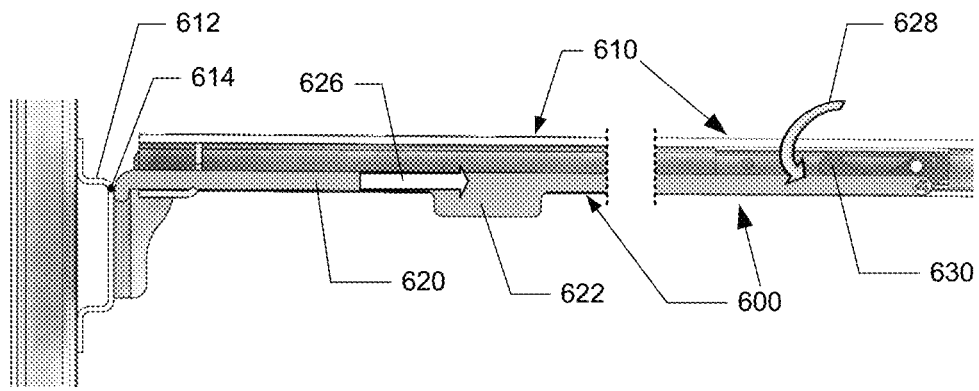
FIG. 6D is a full side view of the deck panel positioned in a work position in accordance with one embodiment of the present disclosure.

FIG. 6A is a side view of the deck panel 610 positioned in a stored position in accordance with one embodiment of the present disclosure. FIG. 6B is a side view of the deck panel 610 positioned in between the stored position and the work position. In this position, the curved end 624 of the extension arm 620 contacts the contact point 614 of the side rail 612. This contact action pushes 626 the extension arm 620 further into the bottom part of the deck panel 610. FIG. 6C is a side view of the deck panel 610 positioned in a work position in accordance with one embodiment of the present disclosure. In this position, the contact point 614 of the extension arm 620 and the side rail 612 has moved. FIG. 6D is a full side view of the deck panel 610 positioned in a work position in accordance with one embodiment of the present disclosure. The embodiment of FIG. 6D illustrates the full view of the extension arm 620 being pushed further into the bottom part of the deck panel 610, which causes the hook 630 to retract 628 into the deck panel 610.

Figure 6E:
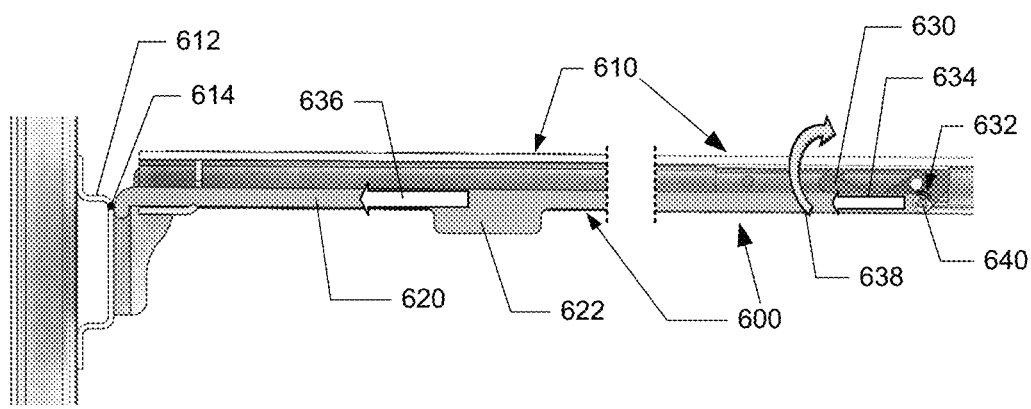
FIG. 6E is a full side view of the deck panel positioned in a work position in accordance with another embodiment of the present disclosure.

A reverse movement of the deck panel 610 from the work position (shown in FIG. 6D) to the stored position (shown in FIG. 6A) can be stated in reverse from the above-listed sequence. For example, starting at the work position of the deck panel 610 shown in FIG. 6E, as the deck panel 610 is raised, the extension arm 620 is pushed in a direction 636 out of the bottom part of the deck panel 610. As shown in FIG. 6E, a spring 632 coupled to an attachment 640 between the extension arm 620 and the hook 630 causes the attachment 640 to move in the same direction 634 as the direction 636 of the extension arm 620. This movement of the attachment 640 pulls the hook 630 out of the bottom part of the deck panel 610 in a direction 638 that is opposite of the direction 628 shown in FIG. 6D. Thus, when the deck panel 610 is fully raised into the stored position (e.g., as shown in FIG. 6A), the hook 630 is fully deployed and is hooked onto a hook holder (e.g., element 802 in FIG. 8A).

FIG. 7A and FIG. 7B are bottom views of a deck panel 710 with a locking device 700 disposed in the bottom part in accordance with one embodiment of the present disclosure. As shown in FIG. 7A, the locking device 700 includes, among other elements, a hook 702 and an extension arm 704. In the stored position shown in FIG. 7A, the hook 702 is fully deployed to engage the hook holder on the other side, while the curved end 706 extends out. When the deck panel 710 is in a stored position as shown in FIG. 7A, the deck panel 710 can be lowered into a work position by raising a lock handle 720 in an up direction 722 to release the hook 702 from the hook holder. This action retracts the hook 702 into the bottom part of the deck panel 710.

Figure 8A:
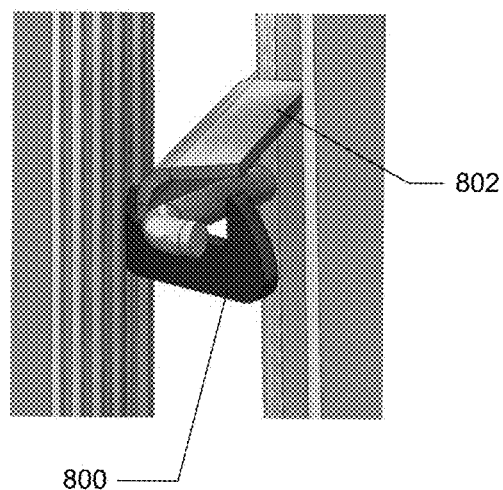
FIG. 8A is a side perspective view of a hook fully engaged to hook onto a hook holder in accordance with one embodiment of the present disclosure.
Figure 8B:
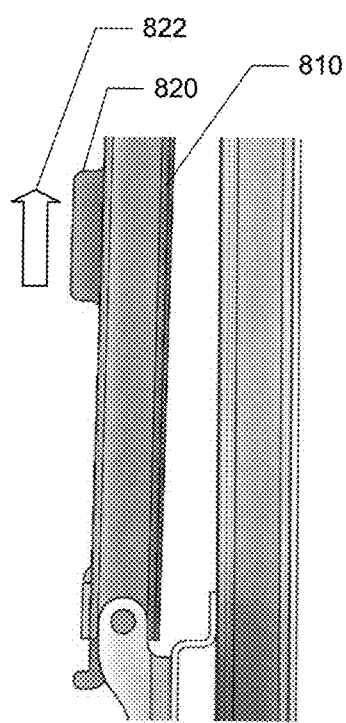
FIG. 8B is a side view of a deck panel in a stored position in accordance with one embodiment of the present disclosure.
Figure 8C:
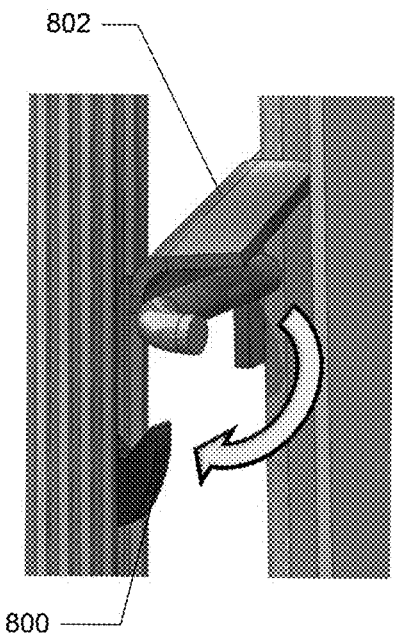
FIG. 8C is a side perspective view of the hook being released from the hook holder in accordance with one embodiment of the present disclosure.

FIG. 8A is a side perspective view of a hook 800 fully engaged to hook onto a hook holder 802 in accordance with one embodiment of the present disclosure. FIG. 8B is a side view of a deck panel 810 in a stored position in accordance with one embodiment of the present disclosure. Again, the deck panel 810 can be lowered into a work position by raising a lock handle 820 in an up direction 822 to release the hook 800 from the hook holder 802. FIG. 8C is a side perspective view of the hook 800 being released from the hook holder 802 in accordance with one embodiment of the present disclosure.

Figure 9A:
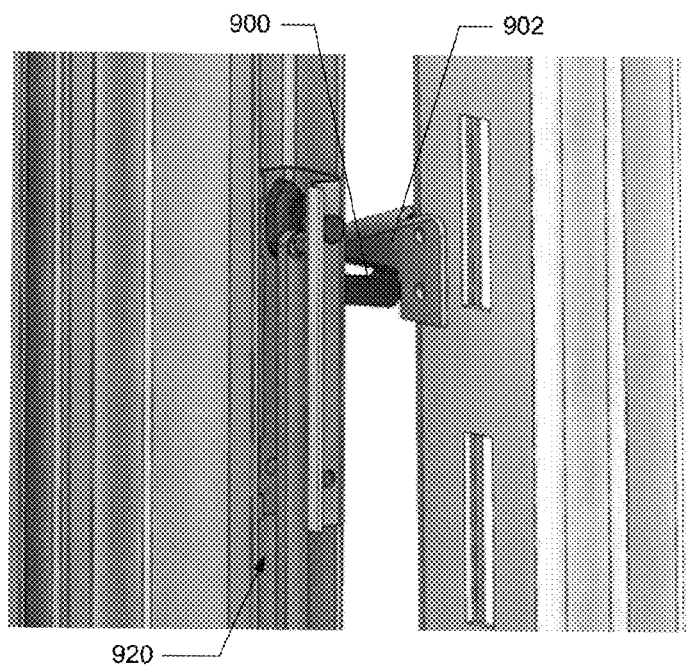
FIG. 9A is another view of a locking device including a hook engaging a hook holder in accordance with one embodiment of the present disclosure.
Figure 9B:
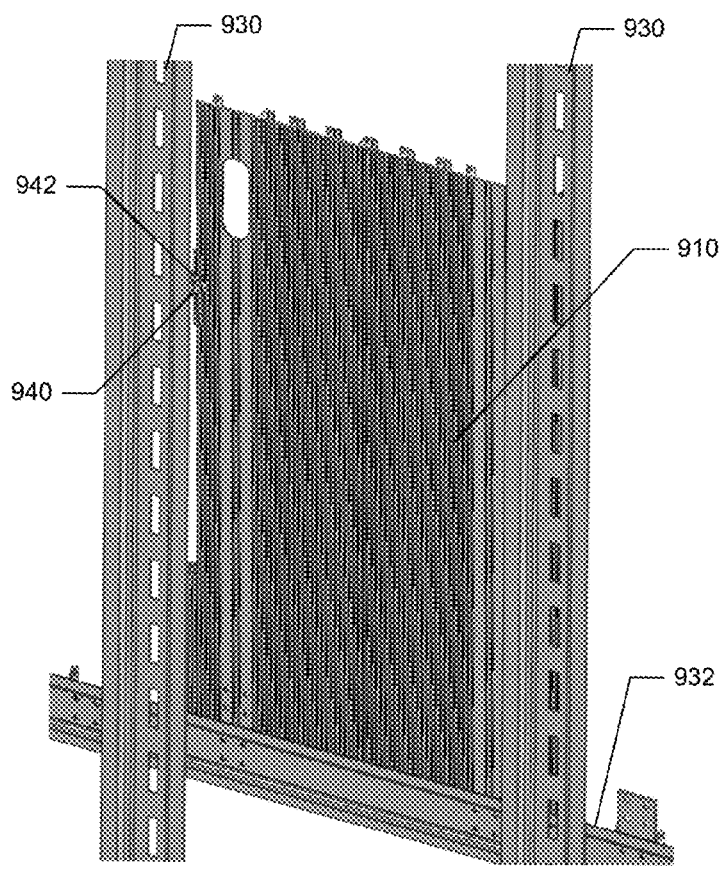
FIG. 9B is a front perspective view of a deck panel with a hook protruding out of the flat surface of the deck panel and engaging a hook holder in accordance with one embodiment of the present disclosure.

FIG. 9A is another view of a locking device 920 including a hook 900 engaging a hook holder 902 in accordance with one embodiment of the present disclosure. FIG. 9B is a front perspective view of a deck panel 910 with a hook 940 protruding out of the flat surface of the deck panel 910 and engaging a hook holder 942 in accordance with one embodiment of the present disclosure. The illustrated embodiment of the FIG. 9B shows the deck panel 910 with respect to the side rail 932 and the vertical posts 930.

The above description of the disclosed embodiments is provided to enable any person skilled in the art to make or use the invention. Various modifications to these implementations will be readily apparent to those skilled in the art, and the generic principles described herein can be applied to other embodiments without departing from the spirit or scope of the invention. For example, while the above-described embodiments focus on a hook which engages a hook holder to secure the deck panel in a stored position, the deck panel can be secured in the stored position using any locking device such as a clamp or ring that can lock onto a holder configured on the side wall of the cargo section. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. An apparatus for securing a deck panel coupled to a wall, the apparatus comprising:
   at least one hinge assembly coupled to the deck panel and the wall, the at least one hinge assembly configured to allow the deck panel to move between a stored position and a work position;
   a hook holder coupled to the wall; and
   a locking device coupled to the deck panel, the locking device having a hook configured to rotate out and away from the deck panel and engage the hook holder when the deck panel is moved from the work position to the stored position.

2. The apparatus of claim 1, wherein the locking device includes a release mechanism to release the locking device from the hook holder when the deck panel is to be moved from the stored position to the work position.

3. The apparatus of claim 1, wherein each of the at least one hinge assembly comprises
   a hinge strap, a pin, at least one bearing, and a hinge butt.

4. The apparatus of claim 3, wherein the hinge strap comprises
   a plurality of holes for accepting a plurality of screws to attach the hinge strap to the deck panel.

5. The apparatus of claim 3, wherein the hinge strap comprises
   an opening configured to receive the pin and the at least one bearing.

6. The apparatus of claim 3, wherein the hinge butt comprises
   a plurality of holes to receive a plurality of screws to attach the hinge strap to the wall.

7. The apparatus of claim 3, wherein the hinge butt comprises
a pair of hinge butt holes configured to secure ends of the pin.

8. The apparatus of claim 1, the locking device comprises an extension arm.

9. The apparatus of claim 8, wherein the extension arm includes a lock handle configured to manually release the deck panel from the stored position.

10. The apparatus of claim 1, wherein the wall is an inner surface of a cargo section of a trailer.

11. An apparatus for coupling a deck panel to a wall, the apparatus comprising:
means for moving the deck panel between a stored position and a work position, the means for moving the deck panel coupled to the deck panel and the wall;
means for engaging a hook holder when the deck panel is moved from the work position to the stored position; and
means for extending configured to push the means for engaging out of the deck panel to engage the hook holder when the deck panel is moved from the work position to the stored position,
wherein the means for extending is configured to retract the means for engaging into the deck panel when the deck panel is moved from the stored position to the work position.

12. The apparatus of claim 11, wherein the means for engaging comprises means for hooking onto the hook holder.

13. The apparatus of claim 11, wherein the means for extending comprises
curved means for pushing the means for extending against the wall to retract the means for engaging.

14. The apparatus of claim 11, further comprising
means for releasing the means for engaging from the hook holder.

15. The apparatus of claim 11, further comprising
means for coupling the means for engaging to the means for extending.

16. The apparatus of claim 11, wherein the means for moving the deck panel includes means for securing the deck panel to the wall.

17. A device coupled to a deck panel, the device comprising:
a plurality of hinges configured to move the deck panel between a stored position and a work position;
a locking mechanism including an extension arm and a hook coupled to the deck panel, and a hook holder coupled to a surface,
wherein the extension arm pushes the hook out of the deck panel to engage the hook holder when the deck panel is moved from the work position to the stored position, and
wherein the extension arm retracts the hook into the deck panel when the deck panel is moved from the stored position to the work position.

18. The device of claim 17, wherein the surface is an inner surface of a cargo section of a trailer.

19. The device of claim 17, wherein the extension arm includes a lock handle configured to manually release the deck panel from the stored position.

20. The device of claim 17, wherein each hinge of the plurality of hinges comprises:
a hinge strap having an opening, the hinge strap configured to attach to the deck panel;
a hinge butt having a pair of side holes, the hinge butt configured to attach to the surface;
at least one bearing configured to insert into the opening of the hinge strap; and
a pin configured to insert into the least one bearing and the opening of the hinge strap through the pair of side holes in the hinge butt to secure the hinge strap to the hinge butt.

* * * * *